United States Patent
Luan et al.

(10) Patent No.: US 10,658,943 B2
(45) Date of Patent: May 19, 2020

(54) POWER CONDITIONING CIRCUIT WITH HYBRID FULL WAVE RECTIFICTION USING MATCHED VIRTUAL JUNCTION RECTIFIER

(71) Applicant: TEXAS INSTRUMENTS INCORPORATED, Dallas, TX (US)

(72) Inventors: Jiyuan Luan, Fremont, CA (US); Michael Oye, Oxnard, CA (US)

(73) Assignee: TEXAS INSTRUMENTS INCORPORED, Dallas, TX (US)

( * ) Notice: Subject to any disclaimer, the term of this patent is extended or adjusted under 35 U.S.C. 154(b) by 252 days.

(21) Appl. No.: 15/201,371

(22) Filed: Jul. 1, 2016

(65) Prior Publication Data

US 2017/0155340 A1 Jun. 1, 2017

Related U.S. Application Data

(60) Provisional application No. 62/187,617, filed on Jul. 1, 2015.

(51) Int. Cl.
*H02J 7/00* (2006.01)
*H02M 7/219* (2006.01)
*H02M 1/08* (2006.01)
*H02M 1/00* (2006.01)
*H02M 3/156* (2006.01)

(52) U.S. Cl.
CPC .............. *H02M 7/219* (2013.01); *H02M 1/08* (2013.01); *H02J 2207/40* (2020.01); *H02M 3/156* (2013.01); *H02M 2001/007* (2013.01)

(58) Field of Classification Search
CPC ......... Y02E 60/12; H02J 7/0068; H02J 7/022; H02J 7/0073; H01M 10/44
USPC ......................................................... 320/137
See application file for complete search history.

(56) References Cited

U.S. PATENT DOCUMENTS

| | | | | |
|---|---|---|---|---|
| 4,183,082 A | * | 1/1980 | Ishii | G05F 1/468 |
| | | | | 323/267 |
| 4,521,671 A | * | 6/1985 | Fronius | B23K 9/091 |
| | | | | 219/130.31 |
| 4,780,805 A | * | 10/1988 | Chewuk | H02M 1/10 |
| | | | | 307/75 |
| 5,233,509 A | * | 8/1993 | Ghotbi | H02M 1/4233 |
| | | | | 323/222 |
| 5,377,093 A | * | 12/1994 | Lee | H02M 3/33507 |
| | | | | 327/309 |

(Continued)

*Primary Examiner* — Arun C Williams
(74) *Attorney, Agent, or Firm* — Michael A. Davis, Jr.; Charles A. Brill; Frank D. Cimino

(57) ABSTRACT

An input power conditioning circuit (PCC) for a switched-mode power converter includes a hybrid full wave rectifier. Hybrid rectification is provided by a main rectifier and a matched virtual junction (VJ) rectifier, both with four-transistor gate fully cross-coupled. The VJ rectifier includes a voltage divider (such as a resistive voltage divider) to generate a virtual junction reference voltage VJ_ref (which can be less than transistor Vth). A power conversion controller (such as a boost controller) includes circuitry (such as an error amplifier) to regulate the input voltage VIN (main rectifier) to be substantially equal to VJ_ref from the VJ rectifier. Hybrid rectification, with VIN regulation, can be used to eliminate reverse (flow back) current, improving power conversion efficiency.

21 Claims, 7 Drawing Sheets

(56) References Cited

U.S. PATENT DOCUMENTS

| | | | | |
|---|---|---|---|---|
| 6,664,762 | B2 * | 12/2003 | Kutkut | H02J 7/022 |
| | | | | 320/116 |
| 7,898,238 | B2 * | 3/2011 | Wiedemuth | H05H 1/46 |
| | | | | 315/224 |
| 8,022,640 | B2 * | 9/2011 | Chen | H02J 7/022 |
| | | | | 315/291 |
| 8,913,404 | B2 * | 12/2014 | Xu | H02M 3/33523 |
| | | | | 363/21.12 |

* cited by examiner

POWER CONDITIONING CIRCUIT WITH HYBRID FULL WAVE RECTIFICTION USING MATCHED VIRTUAL JUNCTION RECTIFIER

CROSS-REFERENCE TO RELATED APPLICATIONS

Priority is claimed under 37 CFR 1.78 and 35 USC 119(e) to U.S. Provisional Application 62/187,617, filed 1 Jul. 2015, which is incorporated by reference.

BACKGROUND

Technical Field

This Patent Disclosure relates generally to power converters, and more particularly to input power conditioning circuits for power converters, such as for use in energy harvesting applications.

Related Art

Energy harvesting (also known as power harvesting or energy scavenging), enables useable electrical energy to be obtained from the environment. One example is wearable devices that can obtain energy from physical/mechanical motions/vibrations of the device, such as using piezoelectric conversion. Energy harvesting enables such devices to be self-powering.

Many energy harvesting sources produce low amplitude AC outputs. A power conversion/supply system is required to convert the harvested energy from AC to DC, and then convert the harvested DC input energy to useable power (voltage and current) supplied to device electronics and/or energy storage (battery). The power conversion/supply system includes input power conditioning to provide AC-DC rectification, and other conditioning, and power conversion to supply DC power at a regulated voltage. For low amplitude input AC power, boost conversion can be used to convert low voltage (harvested) power to a boosted supply voltage required by the device electronics and/or energy storage.

Input power conditioning for AC-DC rectification impacts input voltage requirements and/or power conversion efficiency. For example, for a diode rectifier, the forward voltage drops of p-n junction diodes raise the minimum Vin requirement to 0.6V and above. A similar minimum Vin requirement exists for a diode-connected MOSFET rectifier. A synchronous rectifier can effectively eliminate the diode threshold voltage problem, however, the additional power dissipation for the synchronous rectifier controller sometime exceeds the efficiency gain.

A gate fully-cross coupled rectifier will operate with Vin less that Vth, but the bi-directional current flow of the rectifying MOSFETs creates a reverse (flow back) current condition for Vin<Vth, which can reduce power conversion efficiency, particularly for boost conversion with input capacitive filtering (reactive input impedance).

While this Background information references energy harvesting, the Disclosure in this Patent Document is more generally directed to power conversion systems that convert input AC power into regulated DC power.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for a power conditioning circuit with hybrid full wave rectification using matched virtual junction rectifier, such as can be used in energy harvesting applications.

According to aspects of the Disclosure, a method of providing power conversion including input power conditioning with hybrid rectification includes: (a) rectifying input AC power signals using a main rectifier (four-transistor gate fully cross-coupled rectifier), generating rectified input DC power signals; (b) generating a virtual junction reference voltage VJ_ref by rectifying the input AC power signals using a virtual junction rectifier (a four-transistor gate fully cross-coupled rectifier), generating a reference voltage, and dividing the reference voltage using a voltage divider to generate the virtual junction reference voltage VJ_ref; (c) supplying the input DC power signals at an input voltage VIN to an energy storage device; (d) regulating the input voltage VIN to be substantially equal to the virtual junction reference voltage VJ_ref; and (e) regulating the input DC power signals supplied to the energy storage device by controlling a PWM switch coupled to the energy storage device at a switch node. Input filtering the input DC power signals supplied to the energy storage device can be used to provide input impedance matching.

In other aspects of the Disclosure: (a) the virtual junction reference voltage VJ_ref is less than Vth characterizing the transistors of the main and virtual junction rectifiers; and (b) regulating the input DC power signals supplied to the energy storage is accomplished by boost regulation. and the energy storage device is an inductor with an inductor input-side coupled to receive the input DC power signals, and an inductor load-side coupled to the switch node.

Other aspects and features of the invention claimed in this Patent Document will be apparent to those skilled in the art from the following Disclosure.

BRIEF DESCRIPTION OF THE DRAWINGS

Color Drawings.

This Patent Disclosure contains at least one drawing in color, which is the only practical medium to disclose in the printed Patent Disclosure the subject matter to be patented. Copies of this Patent Disclosure with color drawings will be provided by the Office upon request and payment of the necessary fee.

DETAILED DESCRIPTION

Figure 1A:
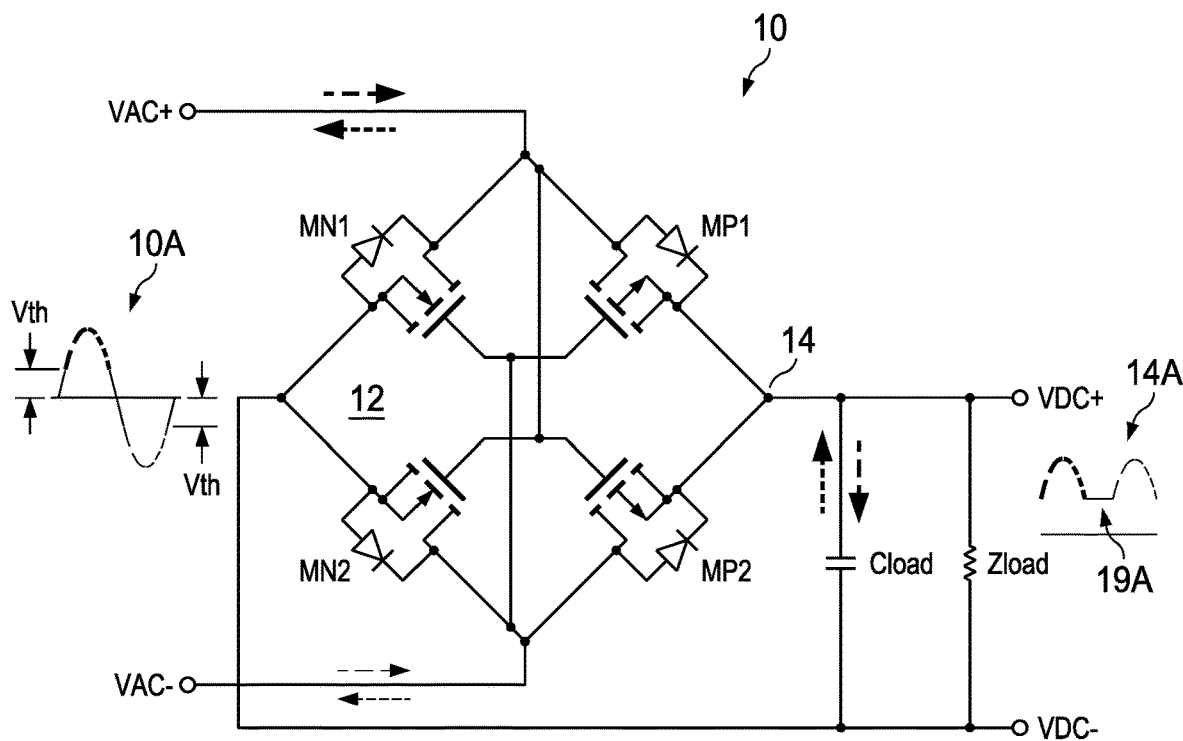
FIG. 1A illustrates a conventional full-wave rectifier (10) using a four transistor gate fully cross-coupled rectifier circuit (12) for rectifying input AC power (10A) to provide input DC power (14A), including reverse (flow back) current during the Vin<Vth (19A).

This Description and the Drawings constitute a Disclosure for NON, including describing example embodiments, and illustrating various technical features and advantages.

In brief overview, an input power conditioning circuit (PCC) for a switched-mode power converter includes a hybrid full wave rectifier. Hybrid rectification is provided by a main rectifier and a matched virtual junction (VJ) rectifier, both with four-transistor gate fully cross-coupled. The VJ rectifier includes a voltage divider (such as a resistive voltage divider) to generate a virtual junction reference voltage VJ_ref (which can be less than transistor Vth). A power conversion controller (such as a boost controller) includes circuitry (such as an error amplifier) to regulate the input voltage VIN (main rectifier) to be substantially equal to VJ_ref from the VJ rectifier. Hybrid rectification, with VIN regulation, can be used to eliminate reverse (flow back) current, improving power conversion efficiency.

In example embodiments, the power converter can include input power conditioning circuitry (PCC) and a power conversion controller (such as a boost controller). The PCC converts input AC power signals received at an AC_IN terminal, into full-wave rectified input DC power signals, provides the input DC power signals through a VIN_DC terminal at an input voltage VIN, and generates a virtual junction reference voltage VJ_ref. The power conversion controller includes input regulation circuitry and power regulation circuitry. The input regulation circuitry includes regulation inputs coupled to receive VIN and VJ_ref, and regulates the input voltage VIN at the VIN_DC terminal to be substantially equal to the virtual junction reference voltage VJ_ref. the power regulation circuitry outputs PWM switch control signals through a PWM_SWITCH terminal for controlling a PWM switch, and regulates the DC power signals supplied through the VIN_DC terminal, at the regulated voltage VIN, for input to an energy storage device, based on the PWM control signals.

According to this Disclosure, the input power conditioning circuitry includes a main rectifier, and a virtual junction rectifier (which can be matched), both comprising a four-transistor gate fully cross-coupled rectifier circuit. The main rectifier rectifies the input AC power signals, to generate the rectified input DC power signals output through the VIN_DC terminal. The virtual junction rectifier rectifies the input AC power signals, and includes voltage divider circuitry (such as a resistive voltage divider) connected to an output of the rectifier circuit, to generate the virtual junction reference voltage VJ_ref.

Embodiments of a power conditioning circuit with hybrid full wave rectification using matched virtual junction rectifier according to this Disclosure can include the following technical features: (a) the transistors of the main rectifier and the virtual junction rectifier can be characterized by a threshold voltage Vth; and the virtual junction reference voltage VJ_ref is less than Vth; (b) the energy storage device can be an inductor with an input-side and a load-side, with the VIN_DC terminal coupleable to the inductor input-side, and with the PWM switch coupleable to the inductor load-side at a switch node; (c) the VIN_DC terminal is coupleable to an input filter capacitor; (d) the input regulation circuitry (loop) can be implemented with an error amplifier including the regulation inputs coupled to receive the input voltage VIN and the virtual junction reference voltage VJ_ref.

The power conditioning circuit with hybrid full wave rectification using matched virtual junction rectifier according to this Disclosure can be used in a switched mode power converter, with an external PWM switch, or the PWM switch can be integrated with the PCC and the power conversion controller to form a power conversion switcher. The PCC, controller and PWM switch can be combined with the energy storage device (such as an inductor) to form a switched mode power supply (SMPS), proving regulated power (voltage-current) to a load.

FIG. 1A illustrates a conventional full-wave rectifier 10, using a four transistor gate fully cross-coupled rectifier circuit 12. Rectifier 10 rectifies input AC power 10A to provide input DC power 14A.

As noted in the Background, a gate fully-cross coupled rectifier will operate with Vin less that Vth, but the bi-directional current flow of the rectifying MOSFETs creates a reverse (flow back) current condition for Vin<Vth.

Figure 1B:
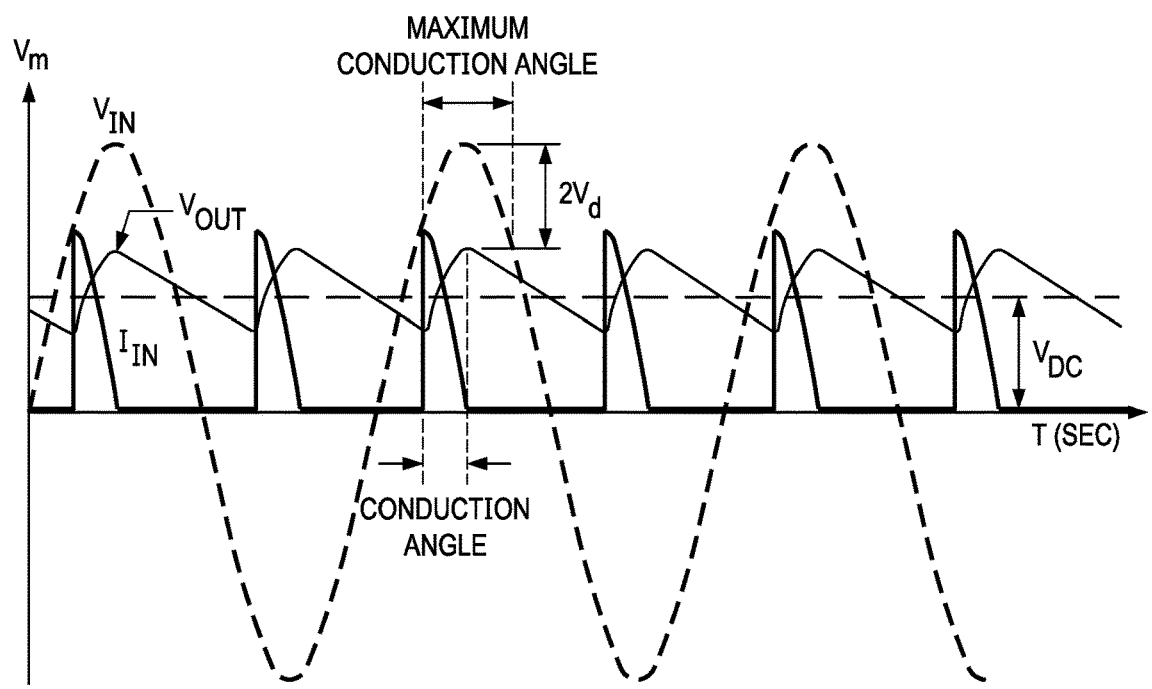
FIGS. 1B-1C are illustrative voltage-current waveforms for the rectifier of FIG. 1A, including a reverse current condition (FIG. 1C, 19).
Figure 1C:
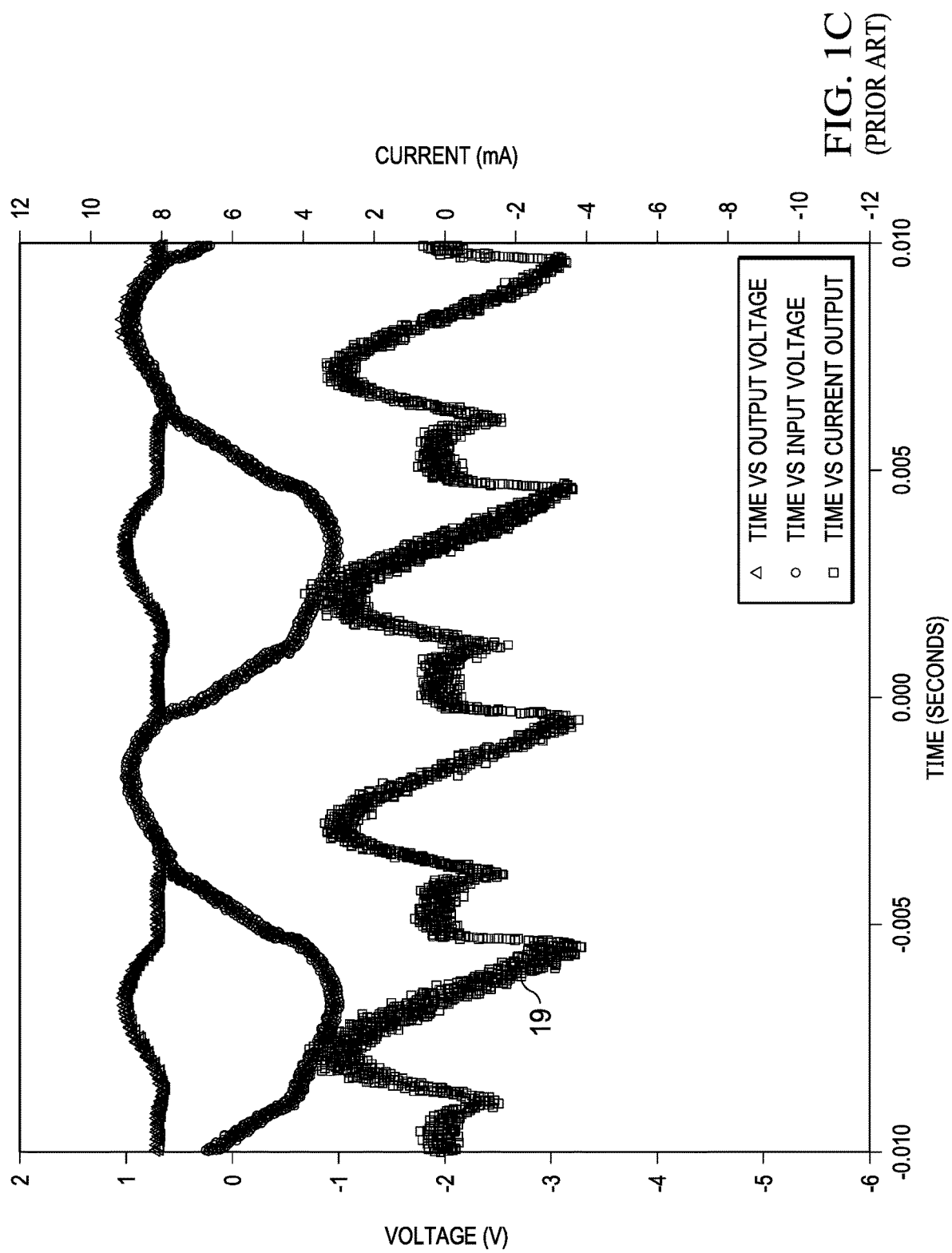

FIGS. 1B-1C are illustrative voltage-current waveforms for the rectifier of FIG. 1A, including a reverse current condition illustrated in FIG. 1C, 19).

FIG. 1B illustrates that the actual conduction angle is less than its maximum conduction angle due to the RC time constant of the load resistance and the output filter capacitor, which further reduces the power conversion efficiency of the full-wave rectifier circuit.

FIG. 1C illustrates the waveform of the rectifier 10 with a capacitive load. Three waveforms show the input voltage, output voltage, and output current. Note It can be seen that the output current reverses direction once the input voltage passes its peak in each cycle. When the current reverses direction, the energy stored in the output capacitor flows back to the input and reduces the rectifier's power conversion efficiency.

Figure 2A:
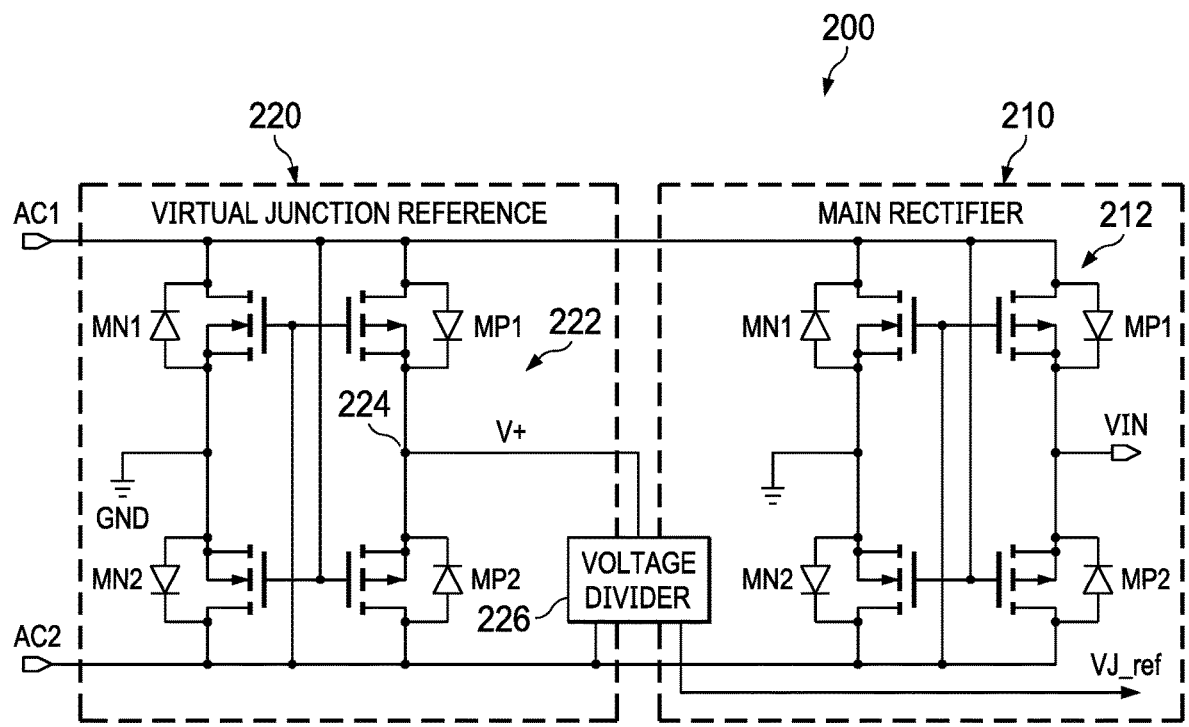
FIG. 2A illustrates an example embodiment of a hybrid full wave four transistor rectifier (200), including a main rectifier (212), and a matched virtual junction rectifier (222), with a voltage divider (226) for providing a virtual junction reference voltage (VJ_ref) according to this Disclosure.

FIG. 2A illustrates an example embodiment of a hybrid full wave four transistor rectifier 200, including a main rectifier 212, and a matched virtual junction rectifier 222.

Virtual junction rectifier 222 effectively mirrors (224) the voltage output of main rectifier 212. Virtual junction rectifier 222 includes a voltage divider 226 for providing a virtual junction reference voltage VJ_ref according to this Disclosure. Virtual junction rectifier 222 is used to establish a potential difference, the virtual junction voltage, between the input and the output of main rectifier 212, effectively eliminating reverse current flow-back.

Since the virtual junction voltage created between mirrored output of virtual junction rectifier 222, and the rectifying output of main rectifier 212 can be regulated by the voltage divider ratio, it therefore can be set to a value significantly less than the actual MOSFET threshold voltage Vth, enabling improved power conversion efficiency. For example, an 80%-90% rectifying efficiency can be achieved at around 0.6V. As comparison, the maximum power conversion efficiency for half-wave rectifier is around 41%, and 81% for a conventional full-wave rectifier, as both require the input voltage to be much higher than the MOSFET/diode threshold voltage.

Figure 2B:
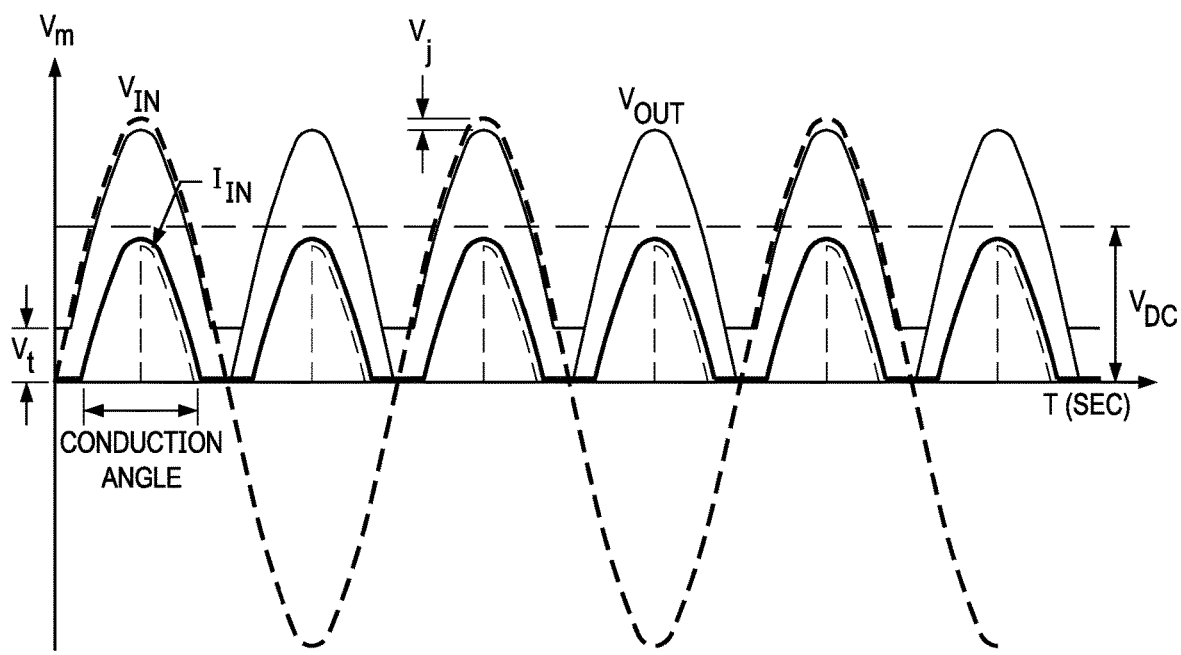
FIG. 2B is an illustrative voltage-current waveform for the hybrid rectifier of FIG. 2A.

FIG. 2B is an illustrative voltage-current waveform for the hybrid rectifier of FIG. 2A. FIG. 2B shows the improvement in the conduction angle of the hybrid rectifier circuit, which results in higher power conversion efficiency. Note that the output of the hybrid rectifier circuit follows the input waveform. This is accomplished by the active input regulation of the boost converter (see, FIG. 3A) which acts to pump the excessive charge from the output of the rectifier to the output of the boost converter, improving the current rectifying efficiency.

Figure 3:
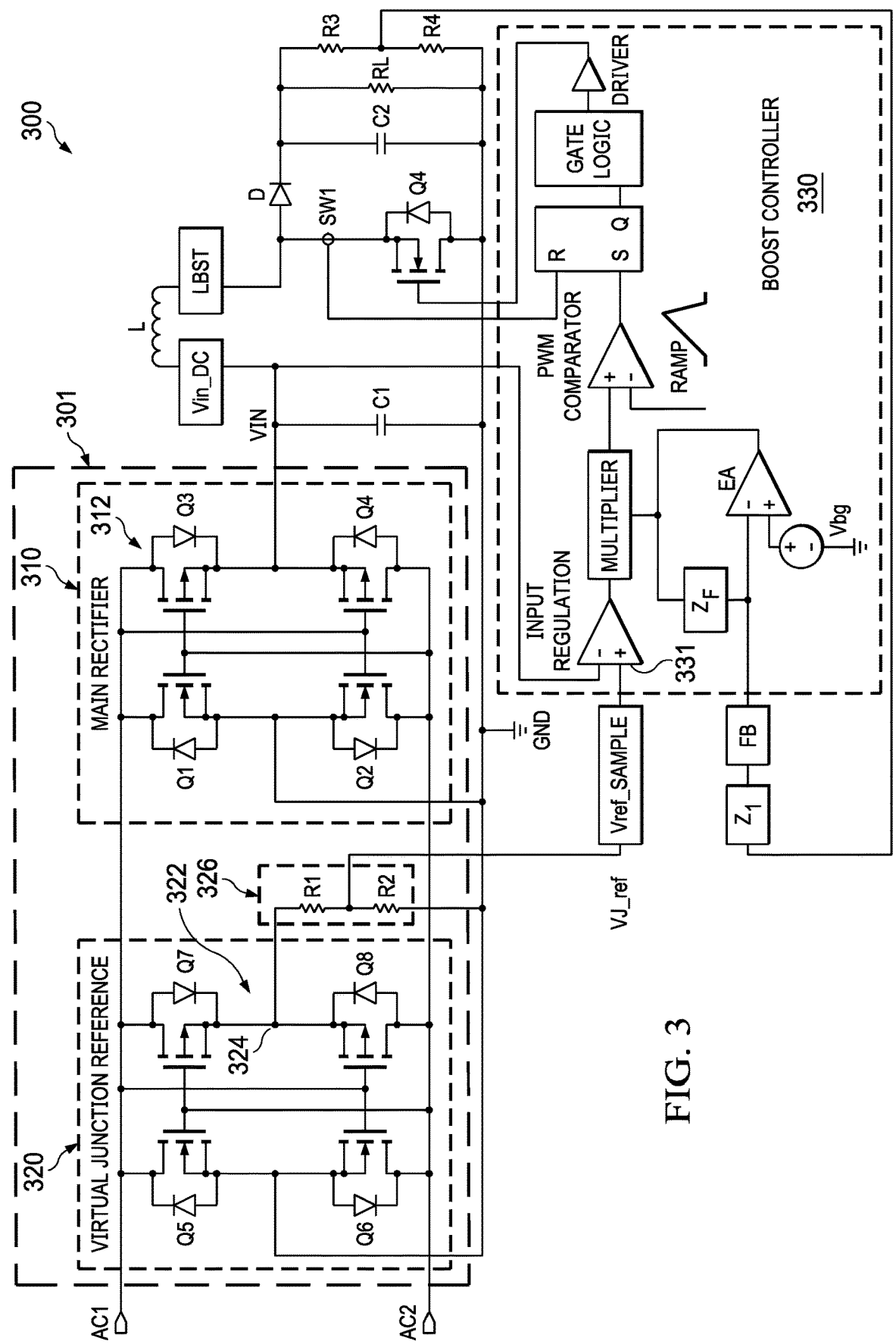
FIG. 3 illustrates an example embodiment of a switched-mode power supply (300), including an input power conditioning circuit (301) providing hybrid full-wave rectification according to this Disclosure, with a main rectifier (310, and rectifier circuit 312), and a matched virtual junction rectifier (320, and rectifier circuit 322), including a voltage divider (326) for providing a virtual junction reference voltage (VJ_ref), and including an example boost controller (330) including an input regulation loop (331) to regulate the input voltage VIN to the virtual junction reference voltage VJ_ref according to this Disclosure.

FIG. 3 illustrates an example embodiment of a switched-mode power supply 300, including an input power conditioning circuit 301 and an example boost power conversion controller 330.

Power conditioning circuit 301 provides hybrid full-wave rectification according to this Disclosure. It includes a main rectifier 310, with a four transistor Q1-Q4 rectifier circuit 312, and a matched virtual junction rectifier 320, with a four transistor Q5-Q8 rectifier circuit 322. Virtual junction rectifier 320 includes a resistive voltage divider 326 for providing a virtual junction reference voltage VJ_ref. For example, a 500 kΩ to 10 MΩ voltage divider will set 5% virtual junction voltage for the hybrid rectifier. Alternatively, the virtual junction reference voltage can be set by a capacitive voltage divider.

Boost controller 330 includes an input regulation loop to regulate the input voltage VIN to the virtual junction reference voltage VJ_ref according to this Disclosure. An error amplifier 331 includes regulation inputs coupled to receive the input voltage VIN and the virtual junction reference voltage VJ_ref, generating an error signal used by boost controller 330 to regulate VIN at the virtual junction reference voltage VJ_ref. This input regulation loop/function enables boost controller 330 to develop a virtual junction which provides uni-directional current flow in MOSFETs with minimal inline voltage and power loss.

Figure 4A:
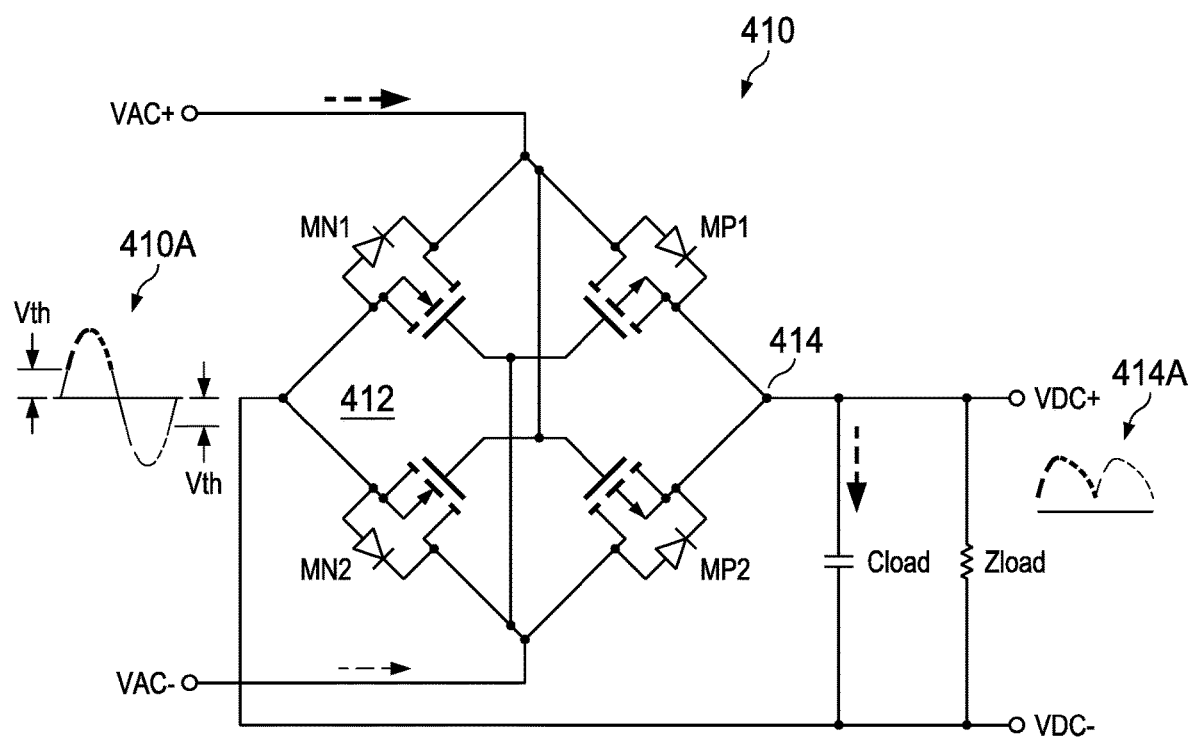
FIGS. 4A-4B functionally illustrate operation of the hybrid full wave rectifier (410, and rectifier circuit 412), using a matched virtual junction rectifier and VJ_ref voltage divider (not shown) to regulate VIN (414) to the virtual junction reference voltage, eliminating reverse (flow back) current (414A, 419).
Figure 4B:
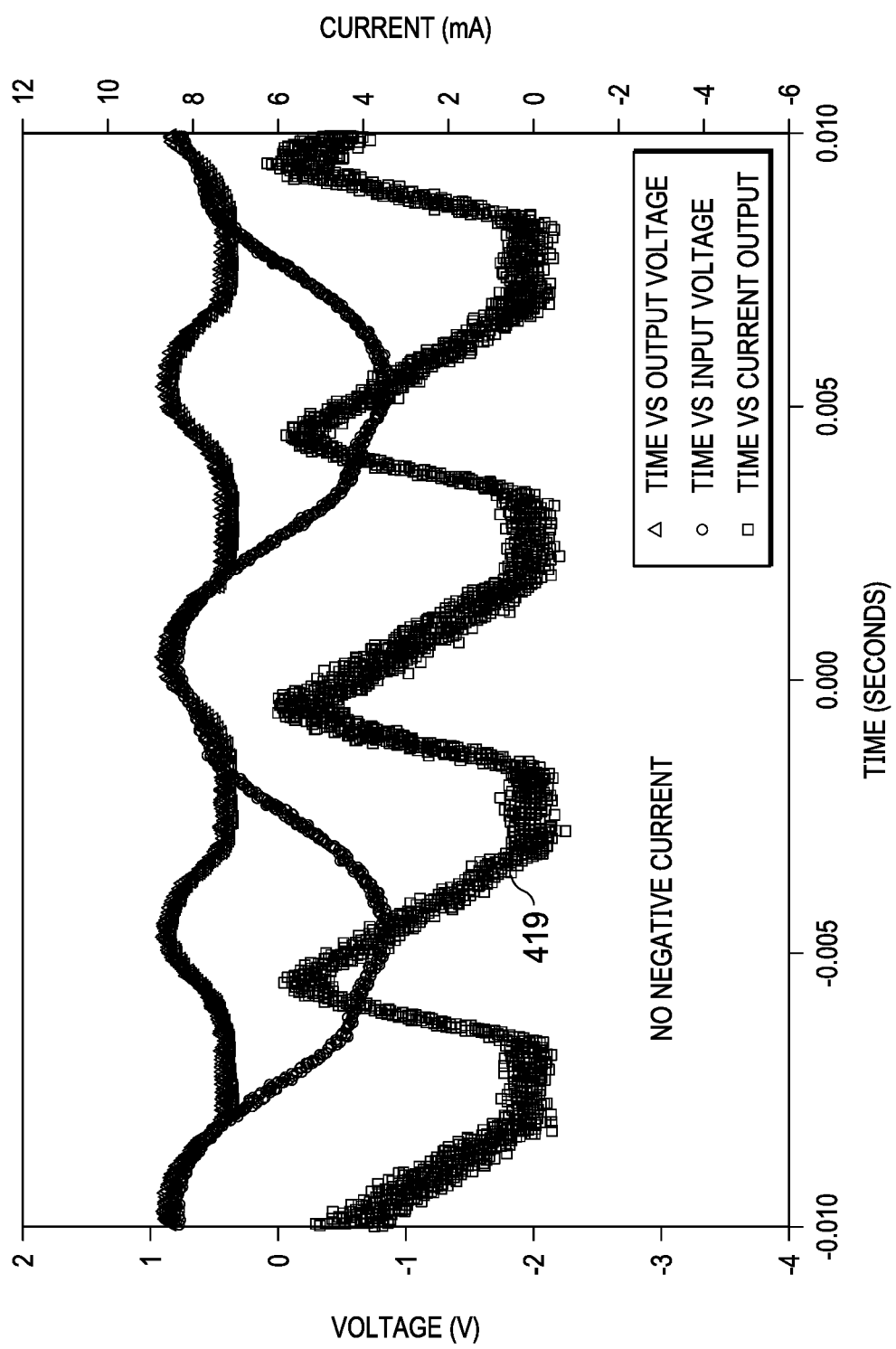

FIGS. 4A-4B functionally illustrate operation of the hybrid full wave rectifier 410, including a rectifier circuit 412, using a matched virtual junction rectifier and VJ_ref voltage divider (not shown) to regulate VIN 414 to the virtual junction reference voltage VJ_ref. The hybrid rectifier 410 according to this Disclosure effectively eliminates reverse (flow back) current (as illustrated at 414A, 419).

FIG. 4B illustrates example voltage and current waveforms for the hybrid rectifier including virtual junction rectification. Note that the output voltage is regulated to follow the input peak voltage, but there is no reverse current flow from the rectifier output to its input. The introduction of the virtual junction voltage effectively eliminates current flow back, increasing power conversion efficiency.

Figure 5A:
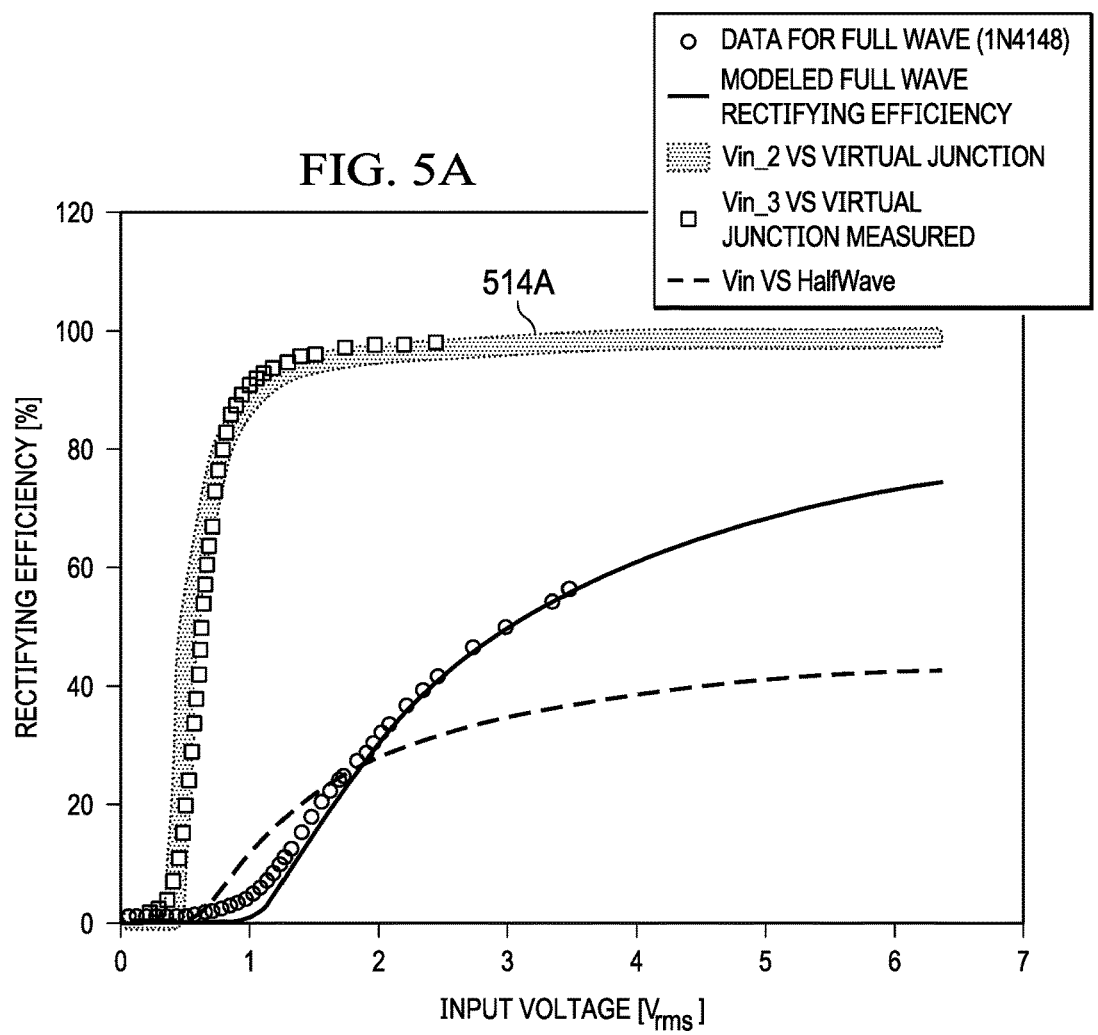
FIGS. 5A-5B are illustrative input voltage (VIN) waveforms with modeled and measured data), including modeled and measured data (514A) for a hybrid full wave rectifier according to this Disclosure.
Figure 5B:
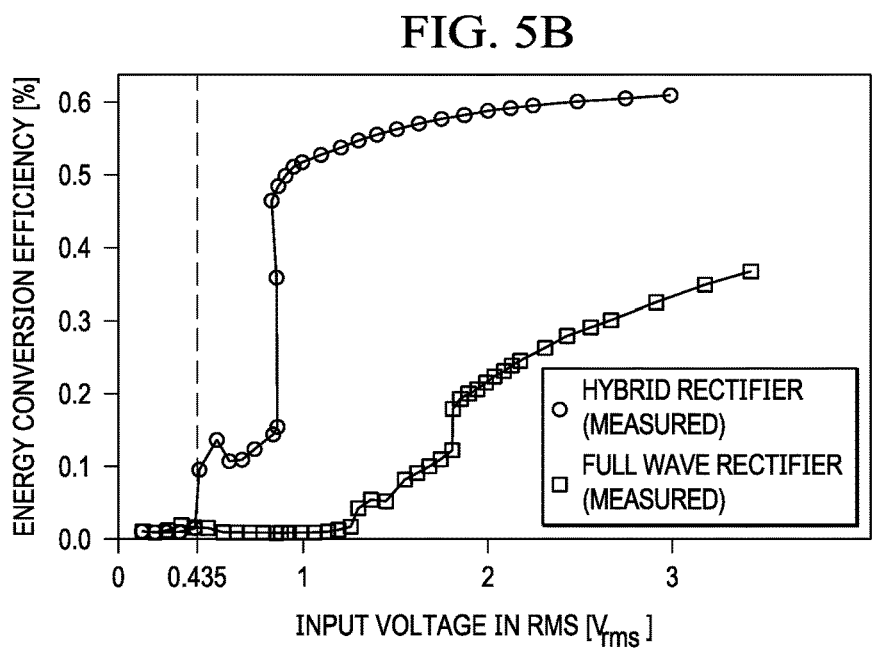

FIGS. 5A-5B are illustrative input voltage (VIN) waveforms with modeled and measured data), including modeled and measured data (514A) for a hybrid full wave rectifier according to this Disclosure.

FIG. 5A illustrates an example comparison of power conversion efficiency based on the measurement results of various types of rectifier circuits. The solid lines are calculated based on theoretical analysis of conventional full-wave rectifier, and the hybrid rectifier, and the dotted lines show the bench measurement. For example, below a particular voltage (~1.7 V in this plot), a half-wave rectifier circuit will have higher power conversion efficiency than the conventional full-wave rectifier circuit. The proposed hybrid rectifier provides improved rectifying efficiency with the lowest input voltage range.

FIG. 5B illustrates an example comparison of the power conversion efficiency of two low voltage power conditioning circuits for energy harvesting applications. Two plots are shown: (a) the power conversion efficiency of the power conditioning circuit when a hybrid rectifier circuit is used with a boost converter (circles), and (b) the efficiency with the same boost circuit with a full-wave diode rectifier circuit (triangles). Both circuits are based on measurements with a 10 mW load. Note that the hybrid rectifier circuit significantly extends the minimum operating voltage range by starting power conversion at around 0.435V. The power conditioning circuit reaches 50% efficiency at around 0.8V input. At the same input voltage, the same boost circuit using a diode rectifier circuit still has not reached its minimal input operating voltage. This reduction in the minimum operating voltage allows many energy harvesting transducers with output voltages between 0.435V and 1.25V to be used for driving typical electronic loads.

For energy harvesting applications, voltage operation range and energy conversion efficiency of the power conditioning circuit are important for the overall system performance. Hybrid full wave rectification using a matched virtual junction rectifier according to this Disclosure, addresses the low voltage and low power characteristics of many energy harvesting systems. As a design example, a hybrid rectifier according to this Disclosure can have a minimum operating voltage of 0.435V(rms), and an energy conversion efficiency of approximately 60% without using a DC-chopping transformer. The hybrid rectifier effectively eliminates current flow back, enabling the hybrid rectifier to achieve 90% full-wave rectifying efficiency at 0.89V(rms). By reducing in-line voltage drop, the hybrid rectifier can be used to significantly reduce the minimum output voltage requirement of the energy harvesting devices, improve the power conversion efficiency of the rectifying circuit.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications, including design examples, can be used by ordinarily skilled artisans as a basis for modifications, substitutions and alternatives to construct other embodiments, including adaptations for other applications.

The invention claimed is:

1. An apparatus comprising:
   a power conversion controller including:
      a first amplifier having a first non-inverting input configured to receive a junction reference voltage from a reference rectifier, a first inverting input configured to receive an input voltage of a boot converter from a main rectifier, and a first amplifier output;
      a second amplifier having a second non-inverting input configured to receive a bandgap reference voltage, a second inverting input configured to receive a feedback voltage indicative of an output voltage from the boost converter, and a second amplifier output;

a multiplier having a first input couple to the first amplifier output, a second input coupled to the second amplifier output, and a multiplier output;

a pulse width modulation (PWM) circuit having an input coupled to the multiplier output, and an output configured to provide a PWM signal for adjusting the boost converter.

2. The apparatus of claim 1, wherein:
the boost converter includes an output terminal having the output voltage, a voltage divider having a first node coupled to the output terminal, and a second node coupled to provide the feedback voltage.

3. The apparatus of claim 1, further comprising:
the main rectifier having a first input configured to receive a first AC signal, a second input configured to receive a second AC signal, and an output configured to provide a rectified input voltage to the boost converter and the first amplifier;
the reference rectifier having a first input configured to receive a first AC signal, a second input configured to receive a second AC signal, and an output; and
a voltage divider having an input coupled to the output of the reference rectifier, and an output configured to provide the junction reference voltage to the first amplifier.

4. The apparatus of claim 3, wherein the first input of the main rectifier is couple to the first input of the reference rectifier, and the second input of the main rectifier is couple to the second input reference rectifier.

5. The apparatus of claim 3, wherein the output of the main rectifier is decoupled from the output of the reference rectifier.

6. The apparatus of claim 1, wherein the power conversion controller is configured to regulate the input voltage of the boost converter based on the junction reference voltage of the reference rectifier.

7. The apparatus of claim 1, wherein the reference rectifier has a matching configuration as the main rectifier.

8. A power conversion controller circuit comprising:
a first input terminal configured to receive a rectified input voltage from a main rectifier for providing the rectified input voltage to a boost converter,
a second input terminal configured to receive a junction reference voltage from a reference rectifier coupled in parallel to the main rectifier across first and second AC terminals,
a first amplifier having a first non-inverting input configured to the second input terminal, a first inverting input configured to the first input terminal, and a first amplifier output,
a second amplifier having a second non-inverting input configured to receive a bandgap reference voltage, a second inverting input configured to receive a feedback voltage indicative of an output voltage from the boost converter, and a second amplifier output, and
a pulse width modulation (PWM) circuit configured to generate a PWM signal for operating the boost converter, the PWM signal is generated based on the first amplifier output and the second amplifier output.

9. The power conversion controller circuit of claim 8, wherein the PWM signal is configured to regulate the input voltage based on the junction reference voltage.

10. The power conversion controller circuit of claim 8, wherein the boost converter includes an output terminal having the output voltage, a voltage divider having a first node coupled to the output terminal, and a second node coupled to provide the feedback voltage.

11. The power conversion controller circuit of claim 8, further comprising:
the main rectifier having a first input configured to receive a first AC signal, a second input configured to receive a second AC signal, and an output configured to provide a rectified input voltage to the boost converter and the first amplifier;
the reference rectifier having a first input configured to receive a first AC signal, a second input configured to receive a second AC signal, and an output; and
a voltage divider having an input coupled to the output of the reference rectifier, and an output configured to provide the junction reference voltage to the first amplifier.

12. The power conversion controller circuit of claim 11, wherein the first input of the main rectifier is coupled to the first input of the reference rectifier, and the second input of the main rectifier is coupled to the second input of the reference rectifier.

13. The power conversion controller circuit of claim 11, wherein the output of the main rectifier is decoupled from the output of the reference rectifier.

14. The power conversion controller circuit of claim 8, wherein the reference rectifier has a matching configuration as the main rectifier.

15. An energy harvesting system comprising:
first and second AC input terminals;
a first rectifier having first input coupled to the first AC input terminal, second input coupled to second AC input terminal, and a first rectified output configured to provide an input voltage to a power converter;
a second rectifier having first input coupled to the second AC input terminal, second input coupled to second AC input terminal, and a second rectified output configured to provide a junction reference voltage for regulating the input voltage;
a first amplifier having a first non-inverting input configured to receive the junction reference voltage, a first inverting input configured to receive the input voltage, and a first amplifier output;
a second amplifier having a second non-inverting input configured to receive a bandgap reference voltage, a second inverting input configured to receive a feedback voltage indicative of an output voltage from the power converter, and a second amplifier output; and
a pulse width modulation (PW1VI) circuit configured to generate a PWM signal for operating the power converter, the PW1V1 signal is generated based on the first amplifier output and the second amplifier output.

16. The energy harvesting system of claim 15, wherein the power converter includes a boost converter having the output voltage regulated above the input voltage.

17. The energy harvesting system of claim 15, wherein the power converter includes an output terminal having the output voltage, a voltage divider having a first node coupled to the output terminal, and a second node coupled to provide the feedback voltage.

18. The energy harvesting system of claim 15, further comprising:
a voltage divider having an input coupled to the output of the second rectifier, and an output configured to provide the junction reference voltage to the first amplifier.

19. The energy harvesting system of claim 15, wherein the first rectifier output is decoupled from the second rectifier output.

20. The energy harvesting system of claim 15, wherein the second rectifier has a matching configuration as the first rectifier.

21. The energy harvesting system of claim 15, further comprising:
   the power converter having a power switch controlled by the PWM signal to convert the input voltage received from the first rectifier output to the output voltage.

* * * * *